United States Patent [19]

Soodak

[11] E Re. 30,181

[45] Reissued Dec. 25, 1979

[54] METHOD AND MEANS FOR SUPPRESSING OZONE GENERATED BY ARC LAMPS

[75] Inventor: Charles Soodak, Silver Spring, Md.

[73] Assignee: Baxter Travenol Laboratories, Inc., Deerfield, Ill.

[21] Appl. No.: 872,120

[22] Filed: Jan. 25, 1978

Related U.S. Patent Documents

Reissue of:

[64] Patent No.: 3,949,258
Issued: Apr. 6, 1976
Appl. No.: 530,052
Filed: Dec. 5, 1974

[51] Int. Cl.[2] ..... H01J 61/52

[52] U.S. Cl. ..... 313/25; 313/27; 313/161; 313/45; 313/46

[58] Field of Search ..... 313/25, 27, 17, 45, 313/46, 161

[56] References Cited

U.S. PATENT DOCUMENTS

| | | | |
|---|---|---|---|
| 2,849,632 | 8/1958 | Gottschalk | 313/25 |
| 3,684,908 | 8/1972 | Beese | 313/24 |

OTHER PUBLICATIONS

"Photoluminescence of Solutions" by C. A. Parker pp. 184–186.

*Primary Examiner*—Rudolph V. Rolinec
*Assistant Examiner*—Darwin R. Hostetter
*Attorney, Agent, or Firm*—Henry W. Collins; Joseph T. Downey; George H. Gerstman

[57] ABSTRACT

A method and means for suppressing ozone generated by high pressure xenon arc lamps and similar luminous discharge arc lamps of a type normally generating ozone. The ozone-generating lamp is enclosed in a gas-tight housing having a quartz or sapphire light emission window able to transmit light including ultraviolet. The housing has metal cover plates on its various sides acting as heat sinks, each of which has a large number of external heat-radiating fins. Clearance is provided inside the housing sufficient to cause the ozone formed by short wavelengths to be broken down by thermal contact with the lamp and to be thus converted into stable $O_2$. The heat generated by the lamp in the housing is transferred to the walls of the housing and is dissipated by the external heat-radiating fins. The inner surfaces of the cover plates are blackened to absorb waste light. The arc is oscillated by an alternating current magnet to continuously shift the area of thermionic emission of electrons from the cathode so as to minimize local deterioration of the cathode and to prevent flicker. The technique operates to selectively remove the short ozone-producing wavelengths (180 to 200 nm) from the radiation emitted through the emission window.

18 Claims, 3 Drawing Figures

METHOD AND MEANS FOR SUPPRESSING OZONE GENERATED BY ARC LAMPS

Matter enclosed in heavy brackets [ ] appears in the original patent but forms no part of this reissue specification; matter printed in italics indicates the additions made by reissue.

This invention relates to ozone suppression techniques, and more particularly to a method and means for suppressing ozone generated by high pressure xenon arc lamps and similar arc lamps which produce ozone by the action of short wavelengths of radiation.

High pressure xenon arc lamps or similar discharge arc lamps, such as those containing mercury or other spectral component producing materials, as used in various devices, produce toxic and dangerous quantities of ozone, which is highly undesirable in the atmosphere of the room containing the associated equipment. In order to protect individuals working with such equipment and to reduce other hazards it is important to eliminate or suppress the ozone, and there has been a long-felt need for such ozone suppression.

A main object of the present invention is to provide an improved method and means for suppressing the ozone produced by such arc lamps.

A further object of the invention is to provide a novel and improved enclosure for an ozone-producing arc lamp which effectively reduces the ozone and converts it into stable $O_2$ by utilizing the heat produced by the lamp.

A still further object of the invention is to provide an improved enclosure for an ozone-producing arc lamp which suppresses the ozone by employing the heat of the lamp to reduce the ozone to stable oxygen and safely dissipates the lamp heat to the surrounding atmosphere, and wherein the enclosure acts as a selective filter to remove the ozone-forming wavelengths from the radiation emitted from the lamp assembly.

A still further object of the invention is to provide an improved ozone-free arc lamp assembly which involves relatively simple components, which is safe to use, which is substantially self-cooling, and which provides emission over a desired range of wavelengths while filtering out ozone-forming wavelengths.

A still further object of the invention is to provide an improved ozone-free arc lamp assembly which includes means for minimizing local deterioration of the arc lamp cathode, thereby greatly extending the useful life of the arc lamp, and which also acts to prevent flicker.

Further objects and advantages of the invention will become apparent from the following description and claims, and from the accompanying drawings, wherein:

Figure 1:
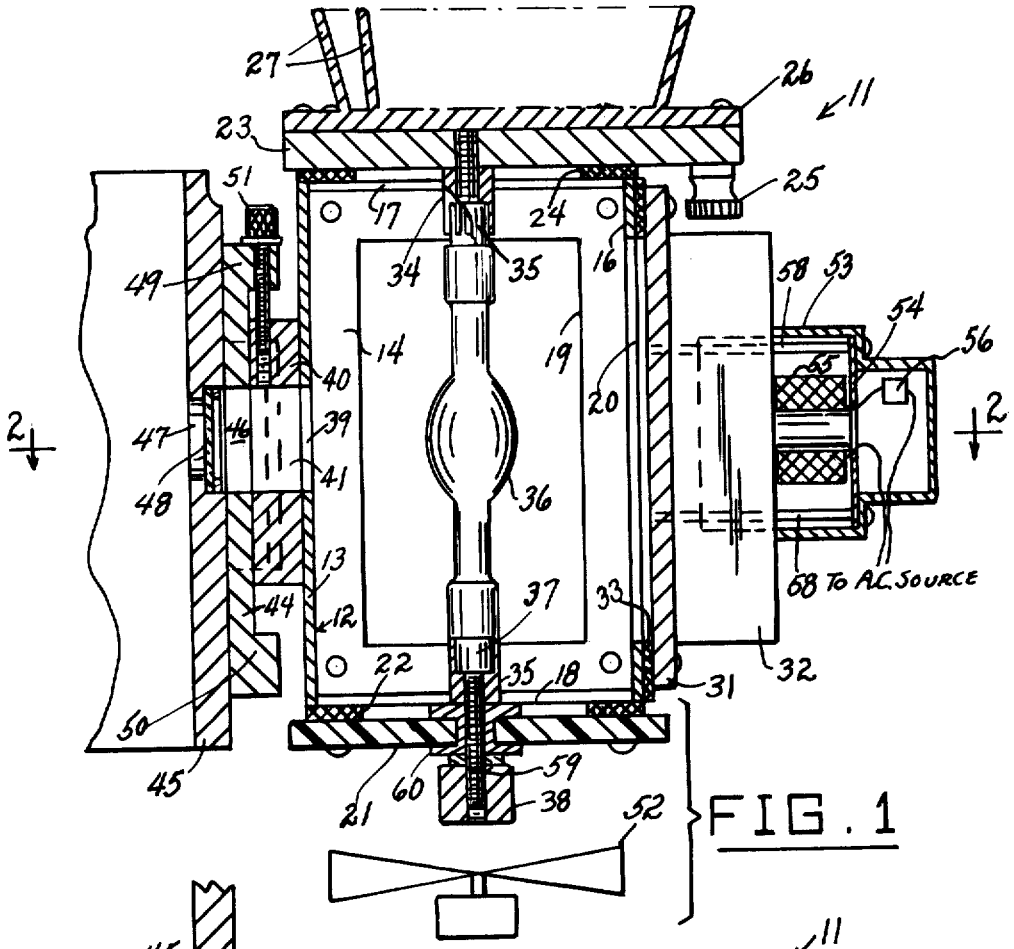
FIG. 1 is a vertical cross-sectional view taken through an improved ozone-free arc lamp assembly following the technique of the present invention, shown mounted on a wall portion of an associated instrument.

Referring to the drawings, 11 generally designates a typical arc lamp assembly constructed in accordance with the present invention. The lamp assembly 11 comprises an inner rectangular housing shell member 12 of suitable sheet metal, such as brass, or the like, having a vertical back wall 13, opposite vertical walls 14 and 15, and a front wall 16. The vertical walls 14 and 15 have inturned top and bottom flanges 17 and 18. The vertical walls 14 and 15 have large rectangular openings 19 comprising most of the face areas thereof, and the front wall 16 has a similar large rectangular opening 20.

Secured to the bottom flanges 18,18 is a plate member 21 of heat-resistant insulating material, such as Transite, or the like, with a flat rectangular frame-like sealing gasket 22 of silicone or other suitable heat-resisting sealing material interposed between said plate member and said flanges. Secured on the top flanges 17,17 is a relatively thick metal plate or block 23 of substantial mass, with a similar flat rectangular frame-like silicone sealing gasket 24 interposed between block member 23 and flanges 17. The right end portion of block member 23, as viewed in FIG. 1, is provided with the depending anode terminal connector 25. Secured on block member 23 is an aluminum extrusion 26 integrally formed with a large number of outwardly extending spaced heat radiation fins 27.

Similarly secured to the opposite vertical walls 14 and 15 are similar aluminum extrusions 28,29, likewise integrally formed with outwardly extending heat radiation-fins, with flat rectangular frame-like silicone sealing gaskets 30 interposed between the vertical walls and the aluminum extrusions. In a like manner, a front aluminum extrusion 31 integrally formed with outwardly extending heat radiation fins 32 is secured to front wall 16, with a flat rectangular frame-like silicone gasket 33 interposed between the extrusion 31 and the wall 16. The extrusions 28,29 and 31, together with the top block 23 and the bottom insulating plate 21, with their associated sealing gaskets, thus seal the housing shell 12, since these members cover the respective rectangular openings 19,19 and 20 and the top and bottom flanges 17,17 and 18,18.

The inside surfaces of the metal members forming the sealed enclosure are preferably blackened to absorb waste light.

Secured to and depending from the top block 23 substantially centrally of the subjacent housing enclosure is the anode terminal socket 34 which receives the anode top terminal 35 of a conventional high pressure xenon arc lamp 36. Threadedly secured on a stud 59 threadedly engaged in a bushing 60 centrally secured in the insulating plate member 21 in vertical alignment with socket 34 is the upstanding cathode terminal socket 35' which receives the cathode bottom terminal 37 of arc lamp 36. At its bottom end portion stud 59 is provided with a terminal connection nut 38.

The lamp enclosure above described is dimensioned to provide substantial clearance for gas movement around lamp 36, preferably at least one inch of clearance, to facilitate the ozone suppression action presently to be described.

Back wall 13 is formed with a light exit aperture 39 substantially aligned with the arc region of lamp 36. An apertured supporting member 40 is externally secured to wall 13, said supporting member having the light passage aperture 41 in registry with aperture 39. Member 40 is formed with opposite vertical guide flanges 42,42. These flanges are slidably received in opposing vertical angle members 43,43 secured to the opposite vertical edges of a block 44 which is in turn secured to the wall 45 of the associated instrument. Block 44 has an aperture 46 which is registrable with aperture 41. The wall 45 has a light input aperture 47 provided with a quartz or sapphire input window 48 in registry with aperture 46.

Block 44 has top and bottom flanges 49 and 50, thereby forming a seat in which supporting member 40 is slidably received and is vertically adjustable. A vertical adjusting screw 51 is rotatably engaged through top flange 49 and is threadedly engaged with supporting member 40, for accurately adjusting the registry of passages 46,41 and for thus providing desired registry of the lamp arc with the transmission window 48.

A suitable circulating fan 52 may be mounted beneath the arc lamp enclosure to blow cooling air upwardly past the enclosure to supplement the cooling action of the heat radiation fins provided on the various aluminum extrusions above described.

Mounted on the front wall aluminum extrusion 31 is a housing 53 of non-magnetic material. Secured in said housing is a vertical non-magnetic plate member 54 on which is horizontally mounted an alternating current magnet 55 with its axis substantially aligned with the arc region of lamp 36. The magnet coil is connected through a suitable resistor 56 to an alternating current source of sufficient strength to drive the lamp arc over the major portion of the thermionic electron emission area of the lamp cathode, whereby the force of the magnet 55, acting perpendicularly to the lamp current flow, causes the arc to oscillate and prevents localized heat deterioration of the cathode emission area.

In the usual arc lamp action, with a nominally stationary arc, when the surface properties of the cathode at the hot spot deteriorate due to the intense heat and current flow, the arc moves to a new location on the cathode, causing flicker. With stabilization by the use of an arc-oscillating magnet as above described, the continuously moving arc causes a "scrubbing" action, to thereby prevent localized deterioration of the cathode surface. This greatly extends the life of the lamp and also eliminates undesirable flicker of the arc.

Figure 2:
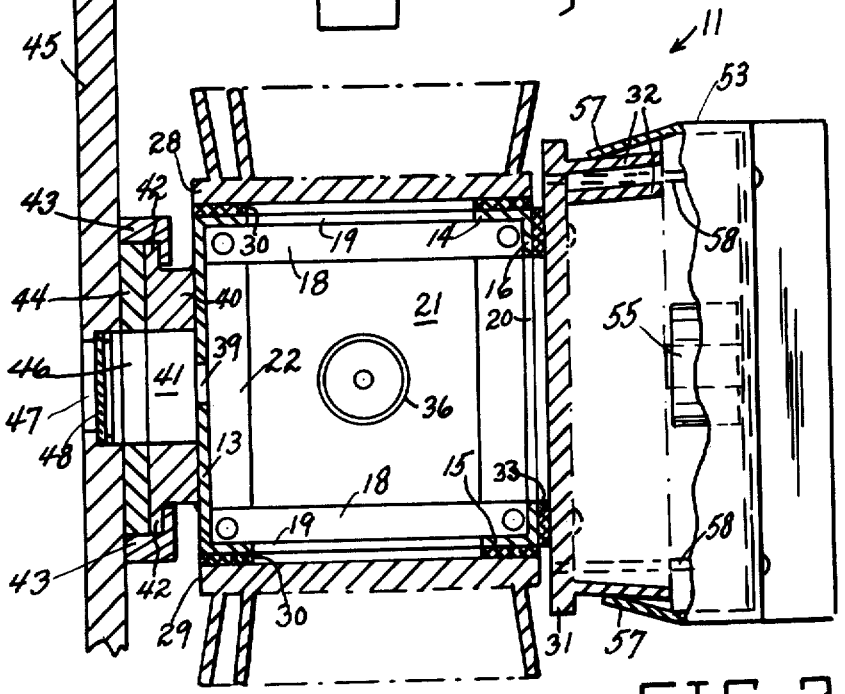
FIG. 2 is a horizontal cross-sectional view taken substantially on the line 2—2 of FIG. 1.

As shown in FIGS. 1 and 2, the magnet housing 53 extends transversely over the fins 32 of extrusion 31 and is provided at its ends with inwardly convergent resilient end flanges 57,57 between which the outwardly diverging end fins 32 are substantially nestingly received. Housing 53 is otherwise rigidly fastened to extrusion 31 by suitable fastening screws 58,58.

The assembly 11 is employed to generate light of a desired spectral character, such as light including ultraviolet, namely, wavelengths as short as 200 nm for use in spectroscopic apparatus and similar equipment. The arc lamp 36 also generates shorter wavelengths, such as from 180 to 200 nm, which produce quantities of ozone. The procedures employed in the past did not suppress the ozone. According to the method of the present invention, the ozone is suppressed by confining the lamp in an enclosure wherein the ozone is also confined and is acted on by the heat of the lamp so as to be converted into stable $O_2$. The heat in the enclosure is transferred to the atmosphere by conduction, convection and radiation, so that the lamp is adequately cooled by the heat transfer.

Figure 3:
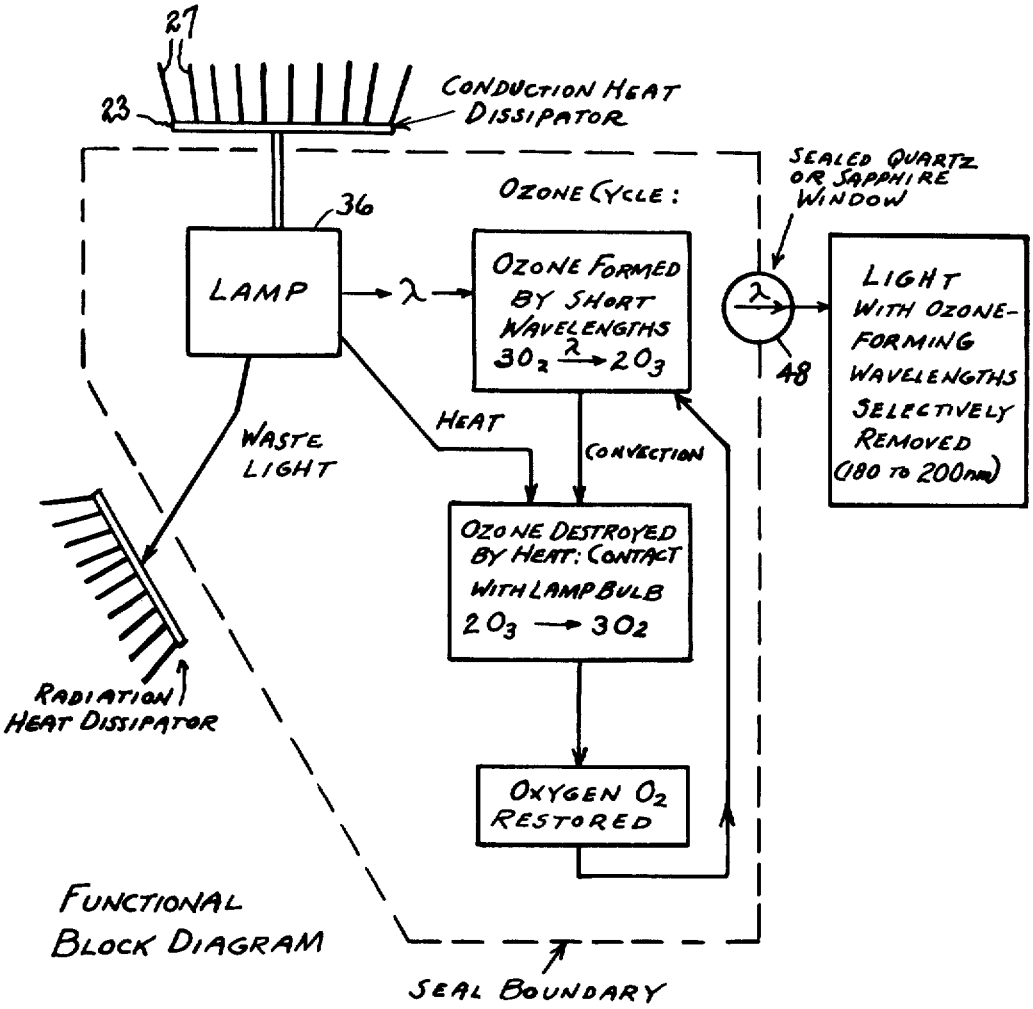
FIG. 3 is a functional block diagram illustrating the technique and mode of operation of the present invention.

The functional block diagram of FIG. 3 shows the method employed according to the present invention for suppressing the ozone generated by the short wavelengths (180 to 200 nm) emitted by lamp 36. As shown in FIG. 3, the normal $O_2$ in the air in the sealed lamp enclosure is converted into ozone by said short wavelengths. The ozone then comes in contact with the hot lamp bulb and is reconverted to stable $O_2$ by the heat. Part of the lamp heat is conducted to the relatively massive top block 23, which acts as a heat sink; this conducted heat is transferred to the extrusion 26 and to the fins 27 which radiate the stored heat to the atmosphere. Waste light (radiant heat) in the enclosure is absorbed by the various wall extrusions and is also transferred by radiation from their fins to the atmosphere. Since there is sufficient space for adequate gas circulation in the sealed enclosure, heat is also transferred to the finned extrusions by convection.

The energy of the short wavelengths (180 to 200 nm) is effectively dissipated by the ozone formation. Therefore, the light passing through the quartz or sapphire window 48 is substantially free of these short wavelengths, so that the enclosure acts as a selective filter for these ozone-forming short wavelengths.

While specific embodiments of an improved method and means for suppressing ozone generated by arc lamps have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In combination, an apparatus including a lamp having a light output which generates ozone, and ozone-suppressing means comprising a substantially sealed enclosure containing oxygen surrounding said lamp and having a transparent exit window arranged to transmit light from the lamp to another portion of the apparatus, the enclosure being sufficiently large relative to the lamp so that ozone generated by said light output in the enclosure is circulated in the enclosure and is converted to stable oxygen by the heat of the lamp, and means for cooling the enclosure[.], *said air cooling means comprising a plurality of outwardly extending heat-radiating fins on the exterior of the enclosure.*

2. The structural combination of claim 1, and wherein the enclosure inside wall surfaces are spaced from the lamp sufficiently to allow free gas circulation in the enclosure.

[3. The structural combination of claim 1, and wherein said cooling means comprises a plurality of outwardly extending heat-radiating fins on the exterior of the enclosure.]

4. The structural combination of claim 1, and wherein in the enclosure includes heat sink means in thermal conductive contact with the lamp.

5. The structural combination of claim 1, and wherein the inside wall surfaces of the enclosure are blackened to maximize absorption of radiant heat energy from the lamp.

6. The structural combination of claim 1, and wherein the lamp comprises an arc lamp and includes material generating ozone-producing short wavelengths, whereby the sealed enclosure surrounding the lamp acts as a selective filter with respect to said ozone-producing short wavelengths.

7. The structural combination of claim 1, and wherein the lamp comprises means to generate an electrical arc, and means to oscillate said arc.

8. The structural combination of claim 7, and wherein said oscillation means comprises an electromagnet mounted substantially perpendicularly to said arc.

9. The structural combination of claim 8, and wherein said electromagnet is mounted on the outside of the enclosure.

10. The structural combination of claim 1, and wherein said sealed enclosure has opposite walls provided at their intermediate portions with terminal sockets, said sockets opposing each other, and wherein said lamp has opposite end terminals supportingly and removably engaged in said sockets so as to allow replacement of the lamp, said sockets being located to support the lamp in a position to transmit light to the exit window.

[11. A method of suppressing ozone in an apparatus of the type including a lamp whose radiation produces ozone from stable oxygen, comprising the steps of enclosing the lamp in a sealed housing containing oxygen, allowing the ozone generated in the housing to circulate around the lamp, thereby causing the ozone produced during operation of the lamp to be converted to stable oxygen by the lamp heat, and cooling the housing during said operation of the lamp.]

*12. In combination, an apparatus including a lamp having a light output which generates ozone, and ozone-suppressing means comprising a substantially sealed enclosure containing oxygen surrounding said lamp and having a transparent exit window arranged to transmit light from the lamp to another portion of the apparatus, the enclosure inside wall surfaces being spaced from the lamp sufficiently to allow free gas circulation in the enclosure; the enclosure being sufficiently large relative to the lamp so that ozone generated by said light output in the enclosure is circulated in the enclosure and is converted to stable oxygen by the heat of the lamp, and means for air cooling the enclosure; said air cooling means comprising heat sink means on the exterior of the enclosure and in thermal conductive contact with the lamp.*

*13. The structural combination of claim 12, and wherein said cooling means comprises a plurality of outwardly extending heat-radiating fins on the exterior of the enclosure.*

*14. The structural combination of claim 12, and wherein the inside wall surfaces of the enclosure are blackened to maximize absorption of radiant heat energy from the lamp.*

*15. The structural combination of claim 14, and wherein the lamp comprises an arc lamp and includes material generating ozone-producing short wavelengths, whereby the sealed enclosure surrounding the lamp acts as a selective filter with respect to said ozone-producing short wavelengths.*

*16. The structural combination of claim 15 and wherein the lamp comprises means to generate an electrical arc and means to oscillate said arc.*

*17. The structural combination of claim 16 and wherein said oscillation means comprises an electromagnet mounted substantially perpendicularly to said arc.*

*18. The structural combination of claim 17 and wherein said electromagnet is mounted on the outside of the enclosure.*

*19. In combination, an apparatus including a lamp having a light output which generates ozone, and ozone-suppressing means comprising a substantially sealed enclosure containing oxygen surrounding said lamp and having a transparent exit window arranged to transmit light from the lamp to another portion of the apparatus, the enclosure inside wall surfaces being spaced from the lamp sufficiently to allow free gas circulation in the enclosure; the enclosure being sufficiently large relative to the lamp so that ozone generated by said light output in the enclosure is circulated in the enclosure and is converted to stable oxygen by the heat of the lamp, and means for cooling the enclosure; said cooling means comprising a plurality of outwardly extending heat-radiating fins on the exterior of the enclosure.*

*20. The structural combination of claim 19, said cooling means comprising a plurality of aluminum extrusions on the exterior of the enclosure, each of said aluminum extrusions being integrally formed with outwardly extending heat radiation fins.*

* * * * *